US010011708B2

(12) United States Patent
Lampela et al.

(10) Patent No.: US 10,011,708 B2
(45) Date of Patent: Jul. 3, 2018

(54) SUPERIOR STRESS WHITENING PERFORMANCE FOR BATTERY CASES

(71) Applicants: ABU DHABI POLYMERS CO. LTD (BOROUGE) LLC., Abu Dhabi (AE); BOREALIS AG, Vienna (AT)

(72) Inventors: Janne Lampela, Abu Dhabi (AE); Thomas Rothmayer, Braunschweig (DE); Chris Chen, Shanghai (CN)

(73) Assignees: ABU DHABI POLYMERS CO. LTD (BOROUGE) LLC., Abu Dhabi (AE); Borealis AG, Vienna (AT)

( * ) Notice: Subject to any disclaimer, the term of this patent is extended or adjusted under 35 U.S.C. 154(b) by 0 days.

(21) Appl. No.: 15/531,974

(22) PCT Filed: Dec. 19, 2014

(86) PCT No.: PCT/CN2014/094431
§ 371 (c)(1),
(2) Date: May 31, 2017

(87) PCT Pub. No.: WO2016/095225
PCT Pub. Date: Jun. 23, 2016

(65) Prior Publication Data
US 2017/0313867 A1    Nov. 2, 2017

(51) Int. Cl.
C08L 23/14       (2006.01)
H01M 2/10        (2006.01)
B29C 45/00       (2006.01)
B29L 31/34       (2006.01)
B29K 23/00       (2006.01)

(52) U.S. Cl.
CPC .......... C08L 23/14 (2013.01); H01M 2/1016 (2013.01); B29C 45/0001 (2013.01); B29K 2023/12 (2013.01); B29L 2031/3468 (2013.01); B29L 2031/3481 (2013.01); C08L 2201/08 (2013.01); C08L 2203/20 (2013.01); C08L 2205/02 (2013.01); C08L 2205/03 (2013.01); C08L 2207/02 (2013.01); C08L 2207/062 (2013.01)

(58) Field of Classification Search
CPC .. C08L 23/14; C08L 2207/02; C08L 2201/08; C08L 2207/062; C08L 2203/20; H01M 2/1016; B29C 45/0001; B29L 2031/3481; B29L 2023/12
See application file for complete search history.

(56) References Cited

U.S. PATENT DOCUMENTS

2007/0037910 A1    2/2007  Murakami
2013/0309431 A1*  11/2013  Bergstra ................. C08L 23/10
                                                    428/36.9
2014/0316070 A1*  10/2014  Sandholzer ........... C08F 210/06
                                                    525/240
2014/0349110 A1    11/2014  Klimke et al.
2015/0322251 A1    11/2015  Kastner et al.
2016/0312019 A1    10/2016  Lampela et al.

FOREIGN PATENT DOCUMENTS

| CN | 1774470 A | 5/2006 |
|---|---|---|
| CN | 102365325 A | 2/2012 |
| CN | 103102594 A | 5/2013 |
| CN | 103748162 A | 4/2014 |
| EP | 0 491 566 A2 | 6/1992 |
| EP | 0 887 379 A1 | 12/1998 |
| EP | 2 141 197 A1 | 1/2010 |
| EP | 2 546 298 A1 * | 1/2013 |
| EP | 2 586 825 A1 * | 5/2013 |
| EP | 2 592 111 A1 | 5/2013 |
| KR | 2015-0091172 A | 8/2015 |
| WO | WO 1987/007620 A1 | 12/1987 |
| WO | WO 1992/012182 A1 | 7/1992 |
| WO | WO 1992/019653 A1 | 11/1992 |
| WO | WO 1992/019658 A1 | 11/1992 |
| WO | WO 1999/024478 A1 | 5/1999 |
| WO | WO 1999/024479 A1 | 5/1999 |
| WO | WO 2000/068315 A1 | 11/2000 |
| WO | WO 2004/000899 A1 | 12/2003 |
| WO | WO 2004/111095 A1 | 12/2004 |
| WO | WO 2010/115878 A1 | 10/2010 |
| WO | WO 2013/026864 A1 | 2/2013 |

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Cheng, "$^{13}$C NMR Analysis of Ethylene-Propylene Rubbers," *Macromolecules* 17:1950-1955 (1984).
*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hanser Publishers, Munich, pp. 956-965 (2001).
Resconi et al., "Selectivity in Propene Polymerization with Metallocene Catalysts," *Chem. Rev.* 100(4):1253-1345 (2000).
Wang et al., "Structural Analysis of Ethylene/Propylene Copolymers Synthesized with a Constrained Geometry Catalyst," *Macromolecules* 33:1157-1162 (2000).

(Continued)

*Primary Examiner* — Robert Harlan
(74) *Attorney, Agent, or Firm* — Leydig, Voit & Mayer, Ltd.

(57) ABSTRACT

Injection molded article with reduced stress whitening, said article comprises a composition of a heterophasic propylene copolymer, inorganic filler and optionally low amounts of a high density polyethylene, wherein said heterophasic propylene copolymer has a propylene copolymer as a matrix.

13 Claims, No Drawings

(56) References Cited

OTHER PUBLICATIONS

Zhou et al., "A new decoupling method for accurate quantification of polyethylene copolymer composition and triad sequence distribution with $^{13}$C NMR," *J. Magnet. Reson.* 187:225-233 (2007).

State Intellectual Property Office of the People's Republic of China, International Search Report in International Application No. PCT/CN2014/094431 (Jul. 2, 2015).

State Intellectual Property Office of the People's Republic of China, Written Opinion in International Application No. PCT/CN2014/094431 (Jul. 2, 2015).

Korean Intellectual Property Office, Notice of Grounds for Rejection in Korean Patent Application No. 10-2017-7015297 (Oct. 19, 2017).

*Polypropylene Handbook*, 2nd Edition, Nello Pasquini, Editor, Hanser, pp. 422-443, (2005).

* cited by examiner

SUPERIOR STRESS WHITENING PERFORMANCE FOR BATTERY CASES

CROSS-REFERENCE TO RELATED APPLICATION

This patent application is the U.S. national phase of International Application No. PCT/CN2014/094431, filed on Dec. 19, 2014, the disclosure of which is incorporated herein by reference in its entirety for all purposes.

The present invention is directed to a new injection molded article with improved stress whitening, said article comprises a polypropylene composition based on a heterophasic propylene copolymer and low amounts of inorganic filler.

In the field of injection molding, especially for injection molded battery cases, good stiffness/impact balance together with excellent stress whitening is required. Typically heterophasic polymers are used to obtain good mechanical properties, especially in terms of good stiffness/impact balance. To obtain acceptable stress whitening performance high loads of high density polyethylene is needed in the final composition. However the addition of high density polyethylene causes further costs and increases the production complexity. Apart from that, higher amounts of high density polyethylene lower the stiffness performance of the final composition.

Accordingly there is still the need to provide a composition for injection molded articles which show a good stiffness/impact balance paired with outstanding stress whitening resistance.

The finding of the present invention is to use a composition comprising a heterophasic propylene copolymer and inorganic filler in low amounts. The heterophasic propylene copolymer must have as matrix a propylene copolymer with low amount of comonomer. Preferably the composition as well as the final injection molded article contains low amounts of high density polyethylene, still more preferably the composition as well as the final injection molded article is free of high density polyethylene. A further finding is that the injection molded article must contain a metal deactivator as well as a long term heat stabilizer. Such an injection molded article is featured by very low stress whitening and good mechanical properties Accordingly the present invention is directed to a injection molded article (IMA) comprising at least 90 wt.-%, based on the total weight of the injection molded article (IMA), of a polypropylene composition (PC), wherein said polypropylene composition (PC) comprises (a) at least 88.25 wt.-%, based on the total weight of the polypropylene composition (PC), of a heterophasic propylene copolymer (RAHECO);
(b) 0.005 to 0.350 wt.-%, based on the total weight of the polypropylene composition (PC), of an organic metal deactivator (MD);
(c) 0.005 to 0.400 wt.-%, based on the total weight of the polypropylene composition (PC), of a sulphur containing antioxidant (SAO);
(d) 0 to 3.0 wt.-%, based on the total weight of the polypropylene composition (PC), of an inorganic filler (F); and
(e) 0 to 8.0 wt.-%, based on the total weight of the polypropylene composition (PC), of a high density polyethylene (HDPE);

wherein further
the heterophasic propylene copolymer (RAHECO)
(i) has a comonomer content in the range of 5.0 to 15.0 mol.-%,
(ii) has a xylene cold soluble (XCS) fraction in the range of 9.0 to 18 wt.-%,
(iii) comprises a propylene copolymer (M) having a comonomer content in the range of 0.4 to 2.0 mol.-%, and
(iv) comprises an elastomeric propylene copolymer (R).

More preferably, the injection molded article (IMA) and/or the polypropylene composition (PC) does not contain a high density polyethylene (HDPE). In case the injection molded article (IMA) and/or the polypropylene composition (PC) contain(s) a high density polyethylene (HDPE), it is preferred that the composition (PC) comprises more than 0 to 8.0 wt.-%, based on the total weight of the polypropylene composition (PC), of the high density polyethylene (HDPE).

Preferably the injection molded article (IMA) and/or the polypropylene composition (PC) comprises does not contain an inorganic filler (F). In case the injection molded article (IMA) and/or the polypropylene composition (PC) comprises an inorganic filler (F) it is preferred that the polypropylene composition (PC) comprises more than 0 to 3.0 wt.-%, based on the total weight of the polypropylene composition (PC), of an inorganic filler (F).

Preferably the comonomer of the propylene copolymer (M) is selected from ethylene, $C_4$ to $C_{12}$ α-olefin, and mixtures thereof, preferably the comonomer of the propylene copolymer (M) is ethylene.

Preferably the elastomeric propylene copolymer (R) has a comonomer content in the range of 45 to 65 mol.-% and/or the comonomer of the elastomeric propylene copolymer (R) is selected from ethylene, $C_4$ to $C_{12}$ α-olefin, and mixtures thereof, preferably the comonomer of the elastomeric propylene copolymer (R) is ethylene.

In a preferred embodiment the heterophasic propylene copolymer (RAHECO) has an amorphous fraction in the range of 8.0 to 15 wt.-%. More preferably the amorphous fraction (AM) of the heterophasic propylene copolymer (RAHECO) has a comonomer content in the range of 35 to 55 mol.-% and/or an intrinsic viscosity (IV) in the range of 2.0 to 2.8 dl/g.

In still another preferred embodiment the melt flow rate $MFR_2$ (230° C.) of the heterophasic propylene copolymer (RAHECO) is in the range of 3.0 to 12 g/10 min and/or the injection molded article (IMA) has a melt flow rate $MFR_2$ (230° C.) in the range of 4.0 to 10 g/10 min.

If the injection molded article (IMA) comprises a high density polyethylene (HDPE) it is preferred that said high density polyethylene (HDPE) has density in the range of 0.940 to 0.970 g/cm$^3$.

Preferably the inorganic filler (F) is talc.

Preferably the organic metal deactivator (MD) is a phenol derivative, like N,N'-bis (3(3',5'-di-tert. butyl-4'-hydroxyphenyl)propionyl) hydrazine.

Preferably the sulphur containing antioxidant (SAO) is di-stearyl-thio-di-propionate ($H_{37}C_{18}OC(O)CH_2CH_2SCH_2CH_2C(O)OC_{18}H_{37}$).

Preferably the injection molded article (IMA) according to this invention is a battery case.

In the following the invention is described in more detail.

The present invention is directed to an injection molded article comprising inter alia a heterophasic propylene copolymer (RAHECO) as defined in more detail below.

The injection molded article (IMA) can be any injection molded article. The term "injection molded article (IMA)" is understood as known in the art. Reference is made inter alia to "Polypropylene Handbook", Nello Pasquini, 2$^{nd}$ edition (2005), pages 422 to 443.

Preferably the injection molded article (IMA) according to this invention is a battery case.

Still more preferably the battery case is for automotives, motor bikes and heavy vehicles.

Preferably the injection molded article (IMA) according to this invention comprises at least 90 wt.-%, more preferably of at least 95 wt.-%, still more preferably in the range of 90 to 99.9 wt.-%, yet more preferably in the range of 95 to 99.9 wt.-%, still yet more preferably in the range of 97 to 99.9 wt.-%, like in the range of 98 to 99.9 wt.-%, based on the total weight of the injection molded article (IMA), of the polypropylene composition (PC).

In one preferred embodiment the injection molded article (IMA) does not comprise a high density polyethylene (HDPE).

In another preferred embodiment, the injection molded article (IMA) according to this invention does not comprise (a) further polymer(s) different to the polymers present in the polypropylene composition (PC), i.e. different to the heterophasic propylene copolymer (RAHECO) and the high density polyethylene (HDPE), in an amount exceeding in total 10 wt.-%, preferably exceeding in total 5 wt.-%, based on the total weight of the injection molded article (IMA). Typically if an additional polymer is present, such a polymer is a carrier polymer for additives and thus does not contribute to the improved properties of the claimed injection molded article (IMA).

Accordingly in one specific embodiment the injection molded article (IMA) consists of the polypropylene composition (PC) as defined herein and additional additives, which might contain in low amounts of polymeric carrier material. However this polymeric carrier material is not more than 10 wt.-%, preferably not more than 5 wt.-%, based on the total weight of the injection molded article (IMA), present in said injection molded article (IMA). Moreover this polymeric carrier material is different to the heterophasic propylene copolymer (RAHECO) and the high density polyethylene (HDPE), which are the polymer components of the polypropylene composition (PC). In a specific embodiment, if polymeric carrier material is present, said polymeric carrier material is an ethylene homopolymer (different to the high density polyethylene (HDPE)) and/or a propylene homopolymer, the latter being preferred. In one particular preferred embodiment the injection molded article (IMA) consists only of the polypropylene composition (PC) as defined herein.

Preferably the polypropylene composition (PC) comprises
(a) at least 88.25 wt.-%, more preferably in the range of 88.88.25 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F),
(e) 0 to 8.0 wt.-%, more preferably in the range of 0 to 7.0 wt.-%, still more preferably in the range of 0 to 6.0 wt.-%, yet more preferably in the range of 0 to 5.0 wt.-%, like in the range of 0 to 4.0 wt.-%, based on the total weight of the polypropylene composition (PC), of a high density polyethylene (HDPE), preferably with the proviso that the polypropylene composition (PC) does not comprise further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In another embodiment the polypropylene composition (PC) comprises
(a) at least 88.25 wt.-%, more preferably in the range of 88.40 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0 to 8.0 wt.-%, more preferably in the range of 0 to 7.0 wt.-%, still more preferably in the range of 0 to 6.0 wt.-%, yet more preferably in the range of 0 to 5.0 wt.-%, like in the range of 0 to 4.0 wt.-%, based on the total weight of the polypropylene composition (PC), of a high density polyethylene (HDPE);
(i) preferably with the proviso that the polypropylene composition (PC) does not comprise an inorganic filler (F) and
(ii) preferably with the further proviso that the polypropylene composition (PC) does not comprise polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

Accordingly it is preferred that the injection molded article (IMA) according to this invention comprises at least 90 wt.-%, more preferably of at least 95 wt.-%, still more preferably in the range of 90 to 99.9 wt.-%, yet more preferably in the range of 95 to 99.9 wt.-%, still yet more preferably in the range of 97 to 99.9 wt.-%, like in the range of 98 to 99.9 wt.-%, based on the total weight of the injection molded article (IMA), of the polypropylene composition (PC), wherein further the polypropylene composition (PC) comprises
(a) at least 92 wt.-%, more preferably in the range of 94 to 99.0 wt.-%, still more preferably in the range of 95 to 99.5 wt.-%, yet more preferably in the range of 96 to 99.9 wt.-%, like in the range of 97 to 99.9 wt.-%, based on the total weight of the polypropylene composition (PC), of a heterophasic propylene copolymer (RAHECO);
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F);
preferably with the proviso that the polypropylene composition (PC) does not comprise a high density polyethylene (HDPE), still more preferably does not comprises further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In another embodiment the injection molded article (IMA) according to this invention comprises at least 90 wt.-%, more preferably of at least 95 wt.-%, still more preferably in the range of 90 to 99.9 wt.-%, yet more preferably in the range of 95 to 99.9 wt.-%, still yet more preferably in the range of 97 to 99.9 wt.-%, like in the range of 98 to 99.9 wt.-%, based on the total weight of the injection molded article (IMA), of the polypropylene composition (PC), wherein further the polypropylene composition (PC) comprises
(a) at least 95 wt.-%, more preferably in the range of 96 to 99.0 wt.-%, still more preferably in the range of 96.5 to 99.5 wt.-%, yet more preferably in the range of 97.0 to 99.9 wt.-%, like in the range of 97.5 to 99.9 wt.-%, based on the total weight of the polypropylene composition (PC), of a heterophasic propylene copolymer (RAHECO);
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(i) preferably with the proviso that the polypropylene composition (PC) does not comprise an inorganic filler (F), and
(ii) more preferably with the further proviso that the polypropylene composition (PC) does not comprise a high density polyethylene (HDPE), still more preferably does not comprises further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In another preferred embodiment the present invention is directed to an injection molded article (IMA) consisting of the polypropylene composition (PC), wherein further the polypropylene composition (PC) comprises
(a) at least 92 wt.-%, more preferably in the range of 94 to 99.5 wt.-%, still more preferably in the range of 95 to 99.5 wt.-%, yet more preferably in the range of 96 to 99.5 wt.-%, like in the range of 97 to 99.9 wt.-%, based on the total weight of the polypropylene composition (PC), of a heterophasic propylene copolymer (RAHECO);
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F);
preferably with the proviso that the polypropylene composition (PC) does not comprise a high density polyethylene (HDPE), still more preferably does not comprises further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In still another preferred embodiment the present invention is directed to an injection molded article (IMA) consisting of the polypropylene composition (PC), wherein further the polypropylene composition (PC) comprises
(a) at least 95 wt.-%, more preferably in the range of 96 to 99.0 wt.-%, still more preferably in the range of 96.5 to 99.5 wt.-%, yet more preferably in the range of 97.0 to 99.9 wt.-%, like in the range of 97.5 to 99.9 wt.-%, based on the total weight of the polypropylene composition (PC), of a heterophasic propylene copolymer (RAHECO);
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(i) preferably with the proviso that the polypropylene composition (PC) does not comprise an inorganic filler (F), and
(ii) more preferably with the further proviso that the polypropylene composition (PC) does not comprise a high density polyethylene (HDPE), still more preferably does not comprises further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In another preferred embodiment, the invention is directed to an injection molded article (IMA) comprising at least 90 wt.-%, more preferably of at least 95 wt.-%, still more preferably in the range of 90 to 99.9 wt.-%, yet more preferably in the range of 95 to 99.9 wt.-%, still yet more preferably in the range of 97 to 99.9 wt.-%, like in the range of 98 to 99.9 wt.-%, based on the total weight of the injection molded article (IMA), of the polypropylene composition (PC), wherein further the polypropylene composition (PC) comprises
(a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F);
(e) 0 to 8.0 wt.-%, more preferably in the range of 0 to 7.0 wt.-%, still more preferably in the range of 0 to 6.0 wt.-%, yet more preferably in the range of 0 to 5.0 wt.-%, like in the range of 0 to 4.0 wt.-%, based on the total weight of the polypropylene composition (PC), of a high density polyethylene (HDPE);
preferably with the proviso that the polypropylene composition (PC) does not comprise further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In still another preferred embodiment, the invention is directed to an injection molded article (IMA) comprising at least 90 wt.-%, more preferably of at least 95 wt.-%, still more preferably in the range of 90 to 99.9 wt.-%, yet more preferably in the range of 95 to 99.9 wt.-%, still yet more preferably in the range of 97 to 99.9 wt.-%, like in the range of 98 to 99.9 wt.-%, based on the total weight of the injection molded article (IMA), of the polypropylene composition (PC), wherein further the polypropylene composition (PC) comprises
(a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) more than 0 to 8.0 wt.-%, more preferably in the range of 0.5 to 7.0 wt.-%, still more preferably in the range of 0.5 to 4.0 wt.-%, yet more preferably in the range of 0.5 to 5.0 wt.-%, like in the range of 0.5 to 5.0 wt.-%, based on the total weight of the polypropylene composition (PC), of a high density polyethylene (HDPE), (i) preferably with the proviso that the polypropylene composition (PC) does not comprise an inorganic filler (F), and
(ii) more preferably with the further proviso that the polypropylene composition (PC) does not comprise further polymers except a polymeric carrier material as defined above, i.e. under (a) and (d). If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In still another preferred embodiment the present invention is directed to an injection molded article (IMA) consisting of the polypropylene composition (PC), wherein further the polypropylene composition (PC) comprises
(a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F);
(e) more than 0 to 8.0 wt.-%, more preferably in the range of 0.5 to 7.0 wt.-%, still more preferably in the range of 0.5 to 4.0. wt.-%, yet more preferably in the range of 0.5 to 5.0 wt.-%, like in the range of 0.5 to 5.0 wt.-%, based on the total weight of the polypropylene composition (PC), of a high density polyethylene (HDPE),
preferably with the proviso that the polypropylene composition (PC) does not comprise further polymers except a polymeric carrier material as defined above. If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

In still another preferred embodiment the present invention is directed to an injection molded article (IMA) consisting of the polypropylene composition (PC), wherein further the polypropylene composition (PC) comprises
(a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO),
(b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);
(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);
(d) more than 0 to 8.0 wt.-%, more preferably in the range of 0.5 to 7.0 wt.-%, still more preferably in the range of 0.5 to 4.0 wt.-%, yet more preferably in the range of 0.5 to 5.0 wt.-%, like in the range of 0.5 to 5.0 wt.-%, based on the total weight of the polypropylene composition (PC), of a high density polyethylene (HDPE),
(i) preferably with the proviso that the polypropylene composition (PC) does not comprise an inorganic filler (F), and
(ii) more preferably with the further proviso that the polypropylene composition (PC) does not comprise further polymers except a polymeric carrier material as defined above, i.e. under (a) and (d). If a polymeric carrier material is present in the polypropylene composition (PC) the amount is not more than 10 wt.-%, preferably not more than 5 wt.-%, like not more than 2 wt.-%, based on the total weight of the polypropylene composition (PC). In a specific embodiment, if polymeric carrier material is present in the polypropylene composition (PC), said polymeric carrier material is an ethylene homopolymer (different to the high density polyethylene (HDPE)) and/or a propylene homopolymer, the latter being preferred.

Preferably the injection molded article (IMA) has a melt flow rate $MFR_2$ (230° C.) in the range of 4.0 to 15 g/10 min, more preferably in the range of 4.0 to 10 g/10 min, like in the range of 4.0 to 8.0 g/10 min.

In a preferred embodiment the injection molded article (IMA) has
(a) a flexural modulus measured according to ISO 178 of at least 1,100 MPa, more preferably of at least 1,200 MPa, yet more preferably in the range of 1,200 to 1,600 MPa; and/or
(b) a notched Izod strength measured according to ISO 180 (23° C.) of at least 7 kJ/m², more preferably in the range of 7.0 to 16 kJ/m², yet more preferably in the range of 7.0 to 14 kJ/m²;
and/or
(c) a tensile strength measured according to ISO 527-2 (cross head speed=50 mm/min; 23° C.) of at least 25.0 MPa, more preferably in the range of 25.0 to 35.0 MPa, yet more preferably in the range of 26.0 to 30.0 MPa.

Preferably the polypropylene composition (PC) has a melt flow rate $MFR_2$ (230° C.) in the range of 4.0 to 15 g/10 min, more preferably in the range of 4.0 to 10 g/10 min, like in the range of 4.0 to 8.0 g/10 min.

In a preferred embodiment the polypropylene composition (PC) is based on the heterophasic propylene copolymer (RAHECO), the organic metal deactivator (MD), the sulphur containing antioxidant (SAO) and—if present—the inorganic filler (F) and/or the high density polyethylene (HDPE). Preferred amounts of the components are mentioned above. Other components might be present, however it is preferred that no further polymers are present except the polymeric carrier material as discussed above. It is especially preferred that the polypropylene composition (PC) consists of the heterophasic propylene copolymer (RAHECO), the organic metal deactivator (MD), the sulphur containing antioxidant (SAO), further additives (to the organic metal deactivator (MD) and the sulphur containing antioxidant (SAO)) and—if present—the inorganic filler (F) and/or the high density polyethylene (HDPE).

Accordingly it is preferred that the polypropylene composition (PC) consists of (a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO), (b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);

(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);

(d) 0.1 to 3.0 wt.-%, more preferably in the range of 0.2 to 3.0 wt.-%, still more preferably in the range of 0.2 to 2.0 wt.-%, yet more preferably in the range of 0.2 to 1.8 wt.-%, like in the range of 0.3 to 1.8 wt.-%, based on the total weight of the polypropylene composition (PC), of an inorganic filler (F);

(e) more than 0 to 8.0 wt.-%, more preferably in the range of 0.5 to 7.0 wt.-%, still more preferably in the range of 0.5 to 4 wt.-%, yet more preferably in the range of 0.5 to 5.0 wt.-%, like in the range of 0.5 to 5 wt.-%, based on the total weight of the polypropylene composition (PC), of a high density polyethylene (HDPE), and (f) more than 0 to 8.0 wt.-%, more preferably in the range of 0.05 to 5.0 wt.-%, still more preferably in the range of 0.1 to 3.0 wt.-%, yet more preferably in the range of 0.1 to 2.0 wt.-%, like in the range of 0.1 to 1.0 wt.-%, based on the total weight of the polypropylene composition (PC), of nucleating agents and/or additives (A), wherein said additives (A) are different to the sulphur containing antioxidant (SAO) and the organic metal deactivator (MD).

In another preferred embodiment the polypropylene composition (PC) consists of (a) at least 88.4 wt.-%, more preferably in the range of 88.4 to 99.0 wt.-%, still more preferably in the range of 90 to 99.5 wt.-%, yet more preferably in the range of 92 to 99.9 wt.-%, like in the range of 95 to 99.9 wt.-%, based on the total weight of the polypropylene composition (PC), of a heterophasic propylene copolymer (RAHECO), (b) 0.005 to 0.350 wt.-%, more preferably in the range of 0.010 to 0.320 wt.-%, still more preferably in the range of 0.015 to 0.300 wt.-%, yet more preferably in the range of 0.020 to 0.28 wt.-%, like in the range of 0.025 to 0.250 wt.-%, based on the total weight of the polypropylene composition (PC), of an organic metal deactivator (MD);

(c) 0.005 to 0.400 wt.-%, more preferably in the range of 0.010 to 0.350 wt.-%, still more preferably in the range of 0.015 to 0.320 wt.-%, yet more preferably in the range of 0.025 to 0.300 wt.-%, like in the range of 0.050 to 0.300 wt.-%, based on the total weight of the polypropylene composition (PC), of a sulphur containing antioxidant (SAO);

(d) more than 0 to 8.0 wt.-%, more preferably in the range of 0.5 to 7.0 wt.-%, still more preferably in the range of 0.5 to 4 wt.-%, yet more preferably in the range of 0.5 to 5.0 wt.-%, like in the range of 0.5 to 5 wt.-%, based on the total weight of the polypropylene composition (PC), of a high density polyethylene (HDPE); and (e) more than 0 to 8.0 wt.-%, more preferably in the range of 0.05 to 5.0 wt.-%, still more preferably in the range of 0.1 to 3.0 wt.-%, yet more preferably in the range of 0.1 to 2.0 wt.-%, like in the range of 0.1 to 1.0 wt.-%, based on the total weight of the polypropylene composition (PC), of nucleating agents and/or additives (A), wherein said additives (A) are different to the sulphur containing antioxidant (SAO) and the organic metal deactivator (MD).

The term "additives" covers also additives which are provided as a masterbatch containing the polymeric carrier material as discussed above. However the term "additive" does not cover nucleating agents, e.g. α-nucleating agents. Typical additives (A) are acid scavengers, antioxidants (different to sulphur containing antioxidant (SAO)), colorants, pigments, light stabilizers, UV-stabilizers, slip agents, anti-scratch agents, dispersing agents, carriers and colorants.

In addition the polypropylene composition (PC) contains preferably a α-nucleating agent. Even more preferred the present invention is free of β-nucleating agents. According to the present invention the nucleating agent is understood as a nucleating agent different to the inorganic filler (F). Accordingly, the nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Preferably the polypropylene composition (PC) contains as α-nucleating agent a vinylcycloalkane polymer and/or a vinylalkane polymer. This nucleating agent is included as described below, namely due to the preparation of the heterophasic propylene copolymer (RAHECO).

Such additives and nucleating agents are generally commercially available and are described, for example, in "Plastic Additives Handbook", 5th edition, 2001 of Hans Zweifel.

In a preferred embodiment the polypropylene composition (PC) has (a) a flexural modulus measured according to ISO 178 of at least 1,100 MPa, more preferably of at least 1,200 MPa, yet more preferably in the range of 1,200 to 1,600 MPa; and/or (b) a notched Izod strength measured according to ISO 180 (23° C.) of at least 7 kJ/m$^2$, more preferably in the range of 7.0 to 16 kJ/m$^2$, yet more preferably in the range of 7.0 to 14 kJ/m$^2$;

and/or (c) a tensile strength measured according to ISO 527-2 (cross head speed=50 mm/min; 23° C.) of at least 25.0 MPa, more preferably in the range of 25.0 to 35.0 MPa, yet more preferably in the range of 26.0 to 30.0 MPa.

The additives which must be present in the injection molded article (IMA) and/or in the polypropylene composition (PC) are the organic metal deactivator (MD) and the sulphur containing antioxidant (SAO). As apparent from the wording the organic metal deactivator (MD) and the sulphur containing antioxidant (SAO) are chemically different from each other. The sulphur containing antioxidant (SAO) belongs to the class of secondary antioxidants (hydroperoxide decomposers). In turn, metal deactivators (MD) form stable complexes with metals, like copper ion. Metals are known to catalyize the decomposition of peroxide.

In the following the the sulphur containing antioxidant (SAO) is defined more precisely. The sulphur containing antioxidant (SAO) must bear a sulphur group. More preferably the sulphur containing antioxidant (SAO) contains at least one ester group, more preferably two ester groups. Accordingly it is preferred that the sulphur containing antioxidant (SAO) is selected from the group consisting of di-stearyl-thio-di-propionate, di-lauryl-thio-di-propionate, di-tridecyl-thio-di-propionate, di-myristyl-thio-di-propionate, di-octadecyl-disulphide, bis[2-methyl-4-(3-n-dodecylthiopropionyloxy)-5-tert-butylphenyl] sulfide, pentaerythritol-tetrakis-(3-laurylthiopropionate), and octa-decyl ester, more preferably is selected from the group consisting of di-stearyl-thio-di-propionate, di-lauryl-thio-di-propionate, di-tridecyl-thio-di-propionate, di-myristyl-thio-di-propionate, and di-octadecyl-disulphide. In one preferred specific embodiment the sulphur containing antioxidant (SAO) is di-stearyl-thio-di-propionate.

The present injection molded article (IMA) and/or the polypropylene composition (PC) may comprise different sulphur containing antioxidant (SAO) as defined in the instant invention, however it is preferred that it/they comprise(s) only one type of sulphur containing antioxidant (SAO) as defined herein.

The organic metal deactivators (MD) according to this invention is preferably an additive stabilizing compounds by deactivating metal ions, introduced by talc and/or other additives in the injection molded article (IMA) and/or in the polypropylene composition (PC). Accordingly in the broadest sense the organic metal deactivator (MD) is a complexing agent that deactivate or reduce the ability of metal ions, like iron ions or copper ions, to initiate or catalyze the degradation of a polymer or of an additive part of a polymer composition (IUPAC, 1996). Thus it is preferred that the organic metal deactivator (MD) comprises at least one, preferably, two —C(O)—NH— groups. Even more preferred the organic metal deactivator (MD) comprises the group of formula (I)

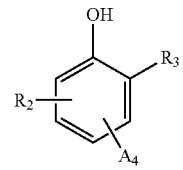

(I)

wherein $R_2$ being located at the ortho- or meta-position to the hydroxyl-group and $R_2$ and $R_3$ are independently selected from the group consisting of $(CH_3)_3C$—, $CH_3$— or H—, preferably $(CH_3)_3C$—, and $A_4$ constitutes the remaining part of organic metal deactivator (MD) and comprises at least one, preferably, two —C(O)—NH— groups.

In particular the organic metal deactivator (MD) comprises the group of formula (II)

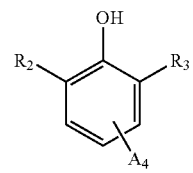

(II)

wherein $R_2$ and $R_3$ are independently selected from the group consisting of $(CH_3)_3C$—, $CH_3$— or H—, preferably $(CH_3)_3C$—, and $A_4$ constitutes the remaining part of organic metal deactivator (MD) and comprises at least one, preferably, two —C(O)—NH— groups.

It is in particular preferred that the organic metal deactivator (MD) comprises two phenolic residues, preferably as defined by formula (IV) or (IVa), which are linked via a bridging group, wherein said group comprises two —C(O)—NH— groups.

Accordingly it is appreciated that the organic metal deactivator (MD) is of the formula (III-a) or (III-b), wherein formula (III-a) is defined as follows:

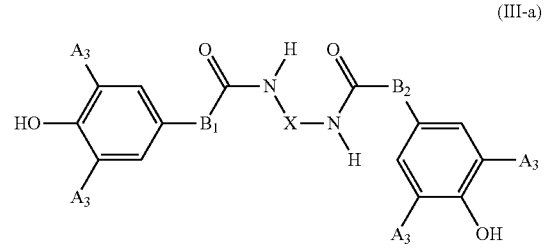

(III-a)

wherein

"$A_3$" are independently selected from the group consisting of $(CH_3)_3C$—, $CH_3$— or H—, preferably $(CH_3)_3C$—, and "$B_1$" and "$B_2$" are independently selected from the group consisting of —$(CH_2)$—, —$(CH_2)_2$— and single bond, and "X" is a single bond or an aliphatic chain, wherein the aliphatic chain (a) consists of 2 to 10 —(CH$_2$)— units or
(b) comprises
   (i) 2 to 10 —(CH$_2$)— units, and
   (ii) at least one, preferably two, —CO—NH— units or a residue of formula (IV)

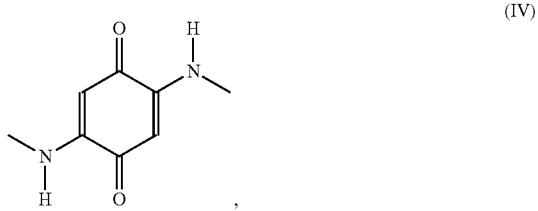

(IV)

and formula (III-b) is defined as follows:

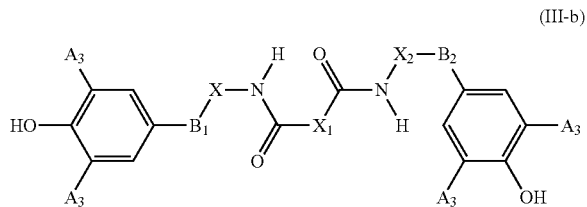

(III-b)

wherein
"A$_3$" are independently selected from the group consisting of (CH$_3$)$_3$C—, CH$_3$— or H—, preferably (CH$_3$)$_3$C—, and
"B$_1$" and "B$_2$" are independently selected from the group consisting of —(CH$_2$)—, —(CH$_2$)$_2$—, —CH=, —CO—, and single bond,
"X" and "X$_2$" are independently selected from the group consisting of =N—, —NH—, —CO—O—CH$_2$—CH$_2$— and single bond, and
"X$_1$" is selected from the group consisting of a single bond and 2 to 10 —(CH$_2$)— units, with the proviso that B$_1$, B$_2$, X, X$_1$, X$_2$ cannot be simultaneously single bonds.

Especially preferred organic metal deactivator (MD) are selected from the group consisting of N,N'-bis (3(3',5'-di-tert. butyl-4'-hydroxyphenyl)propionyl) hydrazine (CAS-no 32687-78-8), 2,2'-oxamido bis-(ethyl-3-(3,5-di-tert. butyl-4-hydroxyphenyl)propionate) (CAS-no 70331-94-1), oxalyl bis(benzylidenehydrazide) (CAS-no 6629-10-3), 2,5-bis(2-(3-(3,5-di-tert. butyl-4-hydroxyphenyl) propionylamido) ethylamino) benzoquinone, tris(2-tert. butyl-4-thio(2'-methyl-4'-hydroxy-5'-tert. butyl)phenyl-5-methyl) phenylphosphite (CAS-no 36339-47-6), and decamethylene-dicarboxy-di-salicyloyl hydrazide (CAS-no 63245-38-5). The most preferred organic metal deactivator (MD) is N,N'-bis (3(3',5'-di-tert. butyl-4'-hydroxyphenyl)propionyl) hydrazine (CAS-no 32687-78-8) and/or 2,2'-oxamido bis-(ethyl-3-(3,5-di-tert. butyl-4-hydroxyphenyl)propionate) (CAS-no 70331-94-1). In one especially preferred embodiment the organic metal deactivator (MD) is N,N'-bis (3(3', 5'-di-tert. butyl-4'-hydroxyphenyl)propionyl) hydrazine (CAS-no 32687-78-8).

The present injection molded article (IMA) and/or the polypropylene composition (PC) may comprise different organic metal deactivators (MD) as defined in the instant invention, however it is preferred that it/they comprise(s) only one type of organic metal deactivators (MD) as defined herein.

One further essential component of the polypropylene composition (PC) is the heterophasic propylene copolymer (RAHECO).

The expression "heterophasic propylene copolymer" or "heterophasic" as used in the instant invention indicates that an elastomeric propylene copolymer is (finely) dispersed in a (semi) crystalline polypropylene. In other words the (semi) crystalline polypropylene constitutes a matrix in which the elastomeric propylene copolymer forms inclusions in the matrix, i.e. in the (semi) crystalline polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

The (semi) crystalline polypropylene according to this invention is the propylene copolymer (M) whereas the elastomeric part is the elastomeric propylene copolymer (R).

It is preferred that the heterophasic propylene copolymer (RAHECO) before mixed with the other components mentioned herein comprises as polymer components only the propylene copolymer (M) as matrix and dispersed therein the elastomeric propylene copolymer (R). In other words the heterophasic propylene copolymer (RAHECO) may contain further additives but no other polymer in an amount exceeding 5 wt.-%, more preferably exceeding 3 wt.-%, like exceeding 1 wt.-%, based on the total amount of the heterophasic propylene copolymer (RAHECO), more preferably based on the polymers present in the heterophasic propylene copolymer (RAHECO). One additional polymer which may be present in such low amounts is a polyethylene which is a reaction product obtained by the preparation of the heterophasic propylene copolymer (RAHECO). Accordingly it is in particular appreciated that the heterophasic propylene copolymer (RAHECO) as defined in the instant invention contains only the propylene copolymer (M), the elastomeric propylene copolymer (R) and optionally a polyethylene in amounts as mentioned in this paragraph.

The polyethylene which might be obtained by the production of the heterophasic propylene copolymer (RAHECO) is not the high density polyethylene (HDPE) as defined in the present invention. The high density polyethylene (HDPE) according to this invention as added separately to the polypropylene composition (PC) and thus is not the polyethylene which might be part in the heterophasic propylene copolymer (RAHECO).

Preferably the heterophasic propylene copolymer (RAHECO) has a melt flow rate MFR$_2$ (230° C.) in the range of 3.0 to 12 g/10 min, more preferably in the range of 4.0 to 10 g/10 min, like in the range of 4.0 to 8.0 g/10 min.

The heterophasic propylene copolymer (RAHECO) according to this invention comprises, more preferably consists of units derived from
(a) propylene,
and as comonomer
(b) ethylene and/or a C$_4$ to C$_{12}$ α-olefin.

Preferably the heterophasic propylene copolymer (RAHECO) comprises propylene and comonomers copolymerizable with propylene, for example comonomers such as ethylene and/or C$_4$ to C$_{10}$ α-olefins, e.g. 1-butene and/or 1-hexene. Preferably the heterophasic propylene copolymer (RAHECO) comprises, especially consists of,—apart from propylene—of commoners selected from the group consisting of ethylene, 1-butene and 1-hexene. More specifically the heterophasic propylene copolymer (RAHECO) comprises—apart from propylene—units derivable from ethylene and/or 1-butene. In a preferred embodiment the heterophasic propylene copolymer (RAHECO) consist of units derivable from ethylene and propylene.

Preferably the comonomer, like ethylene, content in the heterophasic propylene copolymer (RAHECO) is in the range of 5.0 to 15.0 mol-%, more preferably in the range of 6.0 to 12.0 mol-%, still more preferably in the range of 6.5 to 11.0 mol-%, more preferably 7.0 to 10.0 mol-%, like 7.0 to 9.0 mol-%, As stated above the matrix of the first heterophasic propylene copolymer (RAHECO) is the propylene copolymer (M).

The propylene copolymer (M) according to this invention comprises, more preferably consists of units derived from
(a) propylene,
and as comonomer
(b) ethylene and/or a $C_4$ to $C_{12}$ α-olefin.

Preferably the propylene copolymer (M) comprises propylene and comonomers copolymerizable with propylene, for example comonomers such as ethylene and/or $C_4$ to $C_{10}$ α-olefins, e.g. 1-butene and/or 1-hexene. Preferably the propylene copolymer (M) comprises, especially consists of,—apart from propylene—of commoners selected from the group consisting of ethylene, 1-butene and 1-hexene. More specifically the propylene copolymer (M) comprises—apart from propylene—units derivable from ethylene and/or 1-butene. In a preferred embodiment the propylene copolymer (M) consist of units derivable from ethylene and propylene.

Preferably the comonomer, like ethylene, content of the propylene copolymer (M) is in the range of 0.2 to 6.0 mol-%, more preferably in the range of 0.4 to 4.0 mol-%, still more preferably in the range of 0.4 to 2.0 mol-%, more preferably 0.4 to 1.5 mol-%, like 0.5 to 1.3 mol-%, The propylene copolymer (M) can have a xylene cold soluble content (XCS) in a broad range, i.e. up to 5.0 wt.-%. However it is preferred that the propylene copolymer (M) has a xylene cold soluble content (XCS) in the range of 0.3 to 4.0 wt.-%, more preferably in the range of 0.5 to 3.5 wt.-%, like in the range of 1.0 to 3.0 wt.-%.

It is further preferred that the propylene copolymer (M) has a melt flow rate $MFR_2$ (230° C.) in the range of 4.0 to 15 g/10 min, more preferably in the range of 6.0 to 12 g/10 min, like in the range of 7.0 to 10 g/10 min.

One further essential component of the heterophasic propylene copolymer (RAHECO) is its elastomeric propylene copolymer (R).

Preferably, the elastomeric propylene copolymer (R) according to this invention comprises, more preferably consists of units derived from
(a) propylene,
and as comonomer
(b) ethylene and/or a $C_4$ to $C_{12}$ α-olefin.

Preferably the elastomeric propylene copolymer (R) comprises propylene and comonomers copolymerizable with propylene, for example comonomers such as ethylene and/or $C_4$ to $C_{10}$ α-olefins, e.g. 1-butene and/or 1-hexene. Preferably the elastomeric propylene copolymer (R) comprises, especially consists of,—apart from propylene—of commoners selected from the group consisting of ethylene, 1-butene and 1-hexene. More specifically the elastomeric propylene copolymer (R) comprises—apart from propylene—units derivable from ethylene and/or 1-butene. In a preferred embodiment the elastomeric propylene copolymer (R) consist of units derivable from ethylene and propylene.

It is especially preferred the comonomer(s) of the propylene copolymer (M) and the elastomeric propylene copolymer (R) are the same, like ethylene.

Preferably the comonomer, like ethylene, content of the elastomeric propylene copolymer (R) is in the range of 40 to 67 mol-%, more preferably in the range of 42 to 66 mol-%, still more preferably in the range of 43 to 66 mol-%, yet more preferably in the range of 45 to 66 mol-%.

The properties of the elastomeric propylene copolymer (R) mainly influence the xylene cold soluble (XCS) content as well as the amorphous fraction (AM) of the heterophasic propylene copolymer (RAHECO).

Thus it is preferred that the heterophasic propylene copolymer (RAHECO) can have a xylene cold soluble content (XCS) in the range of 8.0 to 20 wt.-%, more preferably in the range of 9.0 to 18.0 wt.-%, yet more preferably in the range of 10 to 15 wt.-%, like in the range of 12 to 14 wt.-%.

Additionally or alternatively to the previous paragraph it is preferred that the heterophasic propylene copolymer (RAHECO) has an amorphous fraction (AM) in the amount of 6.0 to 18 wt.-%, more preferably in the range of 8.0 to 15 wt.-%, yet more preferably in the range of 10 to 14 wt.-%, like in the range of 11 to 13 wt.-%.

Further it is preferred that the elastomeric propylene copolymer (R) has a moderate weight average molecular weight. High intrinsic viscosity (IV) values reflect a high weight average molecular weight. Thus it is appreciated that the amorphous fraction (AM) of the xylene cold soluble fraction (XCS) of the heterophasic propylene copolymer (RAHECO) has an intrinsic viscosity (IV) of equal or higher than 2.0 dl/g, more preferably in the range of 2.0 to 3.0 dl/g, more preferably in the range of 2.0 to 2.8 dl/g, yet more preferably in the range of 2.2 to 2.6 dl/g.

Preferably, the amorphous fraction (AM) comprises, more preferably consists of units derived from
(a) propylene,
and as comonomer
(b) ethylene and/or a $C_4$ to $C_{12}$ α-olefin.

Preferably the amorphous fraction (AM) comprises propylene and comonomers copolymerizable with propylene, for example comonomers such as ethylene and/or $C_4$ to $C_{10}$ α-olefins, e.g. 1-butene and/or 1-hexene. Preferably the amorphous fraction (AM) comprises, especially consists of,—apart from propylene—of commoners selected from the group consisting of ethylene, 1-butene and 1-hexene. More specifically the amorphous fraction (AM) comprises—apart from propylene—units derivable from ethylene and/or 1-butene. In a preferred embodiment the amorphous fraction (AM) consist of units derivable from ethylene and propylene.

Preferably the comonomer, like ethylene, content of the amorphous fraction (AM) is in the range of 35 to 55 mol-%, more preferably in the range of 40 to 50 mol-%, still more preferably in the range of 42 to 48 mol-%.

Most preferably the α-nucleating agent as discussed above is part of the heterophasic propylene copolymer (RAHECO) thus of the polypropylene composition (PC). Accordingly the α-nucleating agent content of the heterophasic propylene copolymer (RAHECO) and thus of the polypropylene composition (PP) is preferably up to 5.0 wt.-%. In a preferred embodiment, the heterophasic propylene copolymer (RAHECO) and thus the polypropylene composition (PC) contain(s) not more than 3,000 ppm, more preferably of 1 to 2,000 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

In a preferred embodiment the heterophasic propylene copolymer (RAHECO) and thus the polypropylene composition (PC) contains a vinylcycloalkane, like vinylcyclohexane (VCH), polymer and/or vinylalkane polymer, as the α-nucleating agent. Preferably in this embodiment, the heterophasic propylene copolymer (RAHECO) contains a vinylcycloalkane, like vinylcyclohexane (VCH), polymer and/or vinylalkane polymer, preferably vinylcyclohexane (VCH). Preferably the vinylcycloalkane is vinylcyclohexane (VCH) polymer which is optionally introduced into the heterophasic propylene copolymer ((RAHECO) and thus into the polypropylene composition (PP) by the BNT technology. More preferably in this preferred embodiment, the amount of vinylcycloalkane, like vinylcyclohexane (VCH), polymer and/or vinylalkane polymer, more preferably of vinylcyclohexane (VCH) polymer, in the heterophasic propylene copolymer (RAHECO) is not more than 500 ppm, more preferably of 0.5 to 200 ppm, most preferably 1 to 100 ppm. Accordingly it is thus preferred that the polypropylene composition (PC) contains not more than 500 ppm, more preferably of 0.1 to 200 ppm, most preferably 0.2 to 100 ppm, of vinylcyclohexane (VCH) polymer.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene according to this invention, i.e. of the heterophasic propylene copolymer (RAHECO). The polymerized vinyl compound acts as an α-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

Further it is preferred that the heterophasic propylene copolymer (RAHECO) is produced in a sequential polymerization process comprising the steps of (a) polymerizing propylene and at least one ethylene and/or $C_4$ to $C_{12}$ α-olefin in a first reactor (R1) obtaining the first polypropylene fraction of the propylene copolymer (PC),
(b) transferring the first polypropylene fraction into a second reactor (R2),
(c) polymerizing in the second reactor (R2) and in the presence of said first polypropylene fraction propylene and at least one ethylene and/or $C_4$ to $C_{12}$ α-olefin obtaining thereby the second polypropylene fraction, said first polypropylene fraction and said second polypropylene fraction form the propylene copolymer (PC), i.e. the matrix of the heterophasic propylene copolymer (RAHECO),
(d) transferring the propylene copolymer (PC) of step (c) into a third reactor (R3),
(e) polymerizing in the third reactor (R3) and in the presence of the propylene copolymer (PC) obtained in step (c) propylene and at least one of ethylene and/or $C_4$ to $C_{12}$ α-olefin obtaining thereby the elastomeric propylene (R), the propylene copolymer (PC) and the elastomeric propylene copolymer (R) form the heterophasic propylene copolymer (RAHECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (RAHECO) is produced in at least two, like three reactors connected in series. Accordingly the present process comprises at least a first reactor (R1) and a second reactor (R2), more preferably a first reactor (R1), a second reactor (R2), and a third reactor (R3).

The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) and the third reactor (R3) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1), and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the present invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic propylene copolymer (HECO) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

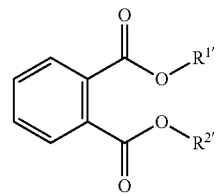

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

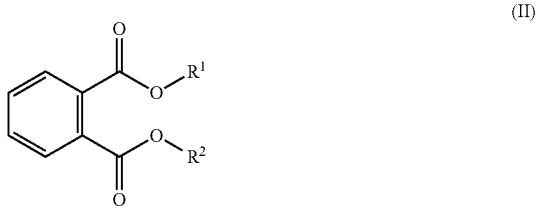

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2 \cdot nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the present invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the present invention has been produced by using ethanol as the alcohol and dioctylphthalate (DOP) as dialkylphthalate of formula (I), yielding diethyl phthalate (DEP) as the internal donor compound.

Still more preferably the catalyst used according to the present invention is the catalyst as described in the example section; especially with the use of dioctylphthalate as dialkylphthalate of formula (I).

For the production of the heterophasic propylene copolymer (HECO) according to the present invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (Ma) or (IIIb). Formula (Ma) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2$(cyclo-pentyl)$_2$] or diisopropyl dimethoxy silane [$Si(OCH_3)_2(CH(CH_3)_2)_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer (HECO) according to the present invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the heterophasic propylene copolymer (RAHECO) is α-nucleated. In case the α-nucleation is not effected by a vinylcycloalkane polymer or a vinylalkane polymer as indicated above, the following α-nucleating agents may be present (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) mixtures thereof.

As another essential component, the polypropylene composition (PC) according to the present invention comprises inorganic filler (F).

In case the inorganic filler (F) is present, the amounts in the polypropylene composition (PC) are those as defined above.

Preferably the inorganic filler (F) is mica, wollastonite, kaolinite, smectite, calcium carbonate, montmorillonite, talc, phyllosilicate or a mixture thereof. The most preferred inorganic filler (F) is talc.

The inorganic filler (F) preferably has a median particle size $d_{50}$ calculated from the particle size distribution in mass percent and measured by laser diffraction in the range of 0.2 to 20.0 µm, more preferably in the range of 0.3 to 15.0 µm, still more preferably in the range of 0.4 to 10.0 µm. The most preferred median particle size $d_{50}$ is in the range of 0.45 to 5.0 µm, including the most appropriate median particle size $d_{50}$ in the range of from 0.45 to 1.2 µm.

Additionally or alternatively, the inorganic filler (F) has a specific surface area BET in the range from 1.0 to 50.0 m$^2$/g, more preferably in the range from 5.0 to 40.0 m$^2$/g, still more preferably in the range from 10.0 to 30.0 m$^2$/g and even more preferably in the range of 10.0 to 20.0 m$^2$/g.

The polypropylene composition (PC) may comprise a high density polyethylene (HDPE). The preferred amounts are provided above. In one preferred embodiment the polypropylene composition (PC) is free of any high density polyethylene.

If present, the high density polyethylene (HDPE) preferably has a density of at least 0.940 g/cm$^3$, more preferably at least 0.950 g/cm$^3$, like in the range of 0.940 to 0.970 g/cm$^3$, still more preferably in the range of 0.950 to 0.962 g/cm$^3$.

Preferably the high density polyethylene (HDPE) has a melt flow rate MFR$_2$ (190° C., 2.16 kg) in the range of 1 to 15 g/10 min, preferably in the range of 1 to 10 g/10 min, more preferably in the range of 1 to 8 g/10 min.

The high density polyethylene (HDPE) according to this invention is known in the art and for instance available as MB7541 from *Borealis* AG.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}$C{$^1$H} NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[mmmm] \% = 100 * (mmmm / \text{sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$$P_{total} = P_{12} + P_{21e}$$

The mole percent of 2,1-erythro regio-defects was quantified with respect to all propene:

$$[21e]\text{ mol.-\%} = 100 * (P_{21e}/P_{total})$$

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Melting temperature ($T_m$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Melting temperature is determined from the second heating step.

Density is measured according to ISO 1183-1—method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01

The amorphous content (AM) is measured by separating the above xylene cold soluble fraction (XCS) and precipitating the amorphous part with acetone. The precipitate was filtered and dried in a vacuum oven at 90° C.

$$AM\ \% = \frac{100 * m1 * v0}{m0 * v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Flexural Modulus was determined in 3-point-bending according to ISO 178 on injection molded specimens of 80×10×4 mm prepared in accordance with ISO 294-1:1996.

Tensile strength; Tensile strain at break (or Elongation at break) are measured according to ISO 527-2 (cross head speed=50 mm/min; 23° C.) using injection molded specimens as described in EN ISO 1873-2 (dog bone shape, 4 mm thickness).

Izod notched impact strength is determined according to ISO 180/1A at 23° C. by using injection moulded test specimens as described in EN ISO 1873-2 (80×10×4 mm)

Median particle size $d_{50}$ (Laser diffraction) is calculated from the particle size distribution [mass percent] as determined by laser diffraction (Mastersizer) according to ISO 13320-1.

Specific surface area is determined as the BET surface according to DIN 66131/2.

Stress whitening was measured according to standard GM9302P using DuPont impact test machine on 3.2 mm (150×90×3.2 mm) thick injection molded plaques.

2. Examples

The present invention is illustrated by the following examples.

Heterophasic propylene copolymer (RAHECO) used for the inventive examples was prepared with one slurry loop reactor and two gas phase reactors by the known Borstar® technology, as disclosed in EP 0 887 379 A1.

The catalyst used in the polymerization process of the RAHECO has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described e.g. in patent publications EP491566, EP591224 or EP586390. The catalyst was pre-polymerized with vinyl cyclohexane in an amount to achieve a concentration of 200 ppm poly(vinyl cyclohexane) (PVCH) in the final polymer (see EP 1183307 A1). As co-catalyst triethyl-aluminium (TEAL) and as donor dicyclo pentyl dimethoxy silane (D-donor) were used. The aluminium to donor ratio is indicated in Table 1.

TABLE 1

Preparation of heterophasic propylene copolymers (RAHECO1) and data of RAHECO2

| | | RAHECO1 | RAHECO2 |
|---|---|---|---|
| Loop | | | |
| TEAL/Ti | [mol/mol] | 200 | 200 |
| TEAL/D donor | [mol/mol] | 13.3 | 13.3 |
| Temperature | [° C.] | 80 | 80 |
| Pressure | [bar] | 55 | 55 |
| C2 | [mol %] | 1.0 | 0 |
| $MFR_2$ (230° C.) | [g/10 min] | 8.5 | 7 |
| XCS | [wt.-%] | 2.5 | 2.0 |
| Split | [wt.-%] | 44 | 43 |
| GPR 1 | | | |
| Temperature | [° C.] | 85 | 85 |
| Pressure | [kPa] | 21 | 21 |
| C2 | [mol %] | 1.0 | 0 |
| $MFR_2$ (230° C.) | [g/10 min] | 8.5 | 7 |

TABLE 1-continued

Preparation of heterophasic propylene copolymers (RAHECO1) and data of RAHECO2

|  |  | RAHECO1 | RAHECO2 |
|---|---|---|---|
| XCS | [wt.-%] | 2.0 | 1.5 |
| Split | [wt.-%] | 44 | 43 |
| GPR 2 (Final) |  |  |  |
| Temperature | [° C.] | 75 | 75 |
| Pressure | [kPa] | 18 | 18 |
| MFR$_2$ (230° C.) | [g/10 min] | 7.0 | 3.5 |
| XCS | [wt.-%] | 13.0 | 15.0 |
| AM | [wt.-%] | 12.0 | 14.0 |
| C2 of AM | [mol %] | 45.8 | 50 |
| IV of AM | [dl/g] | 2.4 | 3.3 |
| C2 total | [mol %] | 8.7 | 8.8 |
| Split | [wt.-%] | 12 | 14 |

R polymer produced in the GPR2 (=elastomeric propylene copolymer (R))
RAHECO2 the matrix is a propylene homopolymer
Polypropylene compositions (PC) according to the present invention were produced by melt blending.

TABLE 2

Properties of the inventive examples and comparative example

|  |  | Example | | | | | |
|---|---|---|---|---|---|---|---|
|  |  | IE 1 | IE 2 | IE3 | IE4 | IE5 | CE1 |
| RAHECO1 | [wt %]* | 98.56 | 96.56 | 94.56 | 92.56 | 90.56 | 0.00 |
| RAHECO2 |  | 0.00 | 0.00 | 0.00 | 0.00 | 0.00 | 90.56 |
| Talc | [wt %]* | 1.00 | 1.00 | 1.00 | 1.00 | 1.00 | 1.00 |
| HDPE | [wt %]* | 0.00 | 2.00 | 4.00 | 6.00 | 8.00 | 8.00 |
| DSTDP | [wt %]* | 0.22 | 0.22 | 0.22 | 0.22 | 0.22 | 0.22 |
| MD | [wt %]* | 0.05 | 0.05 | 0.05 | 0.05 | 0.05 | 0.05 |
| MFR | [g/10 min] | 7.0 | 6.6 | 6.6 | 6.6 | 6.6 | 3.5 |
| Tensile Modulus | [MPa] | 1420 | 1330 | 1320 | 1290 | 1260 | 1330 |
| Tensile strength | [MPa] | 27.1 | 27.4 | 27.4 | 27.3 | 27.7 | 24.8 |
| NIS + 23° C. | [kJ/m$^2$] | 7.8 | 8.9 | 9.0 | 9.7 | 12.0 | 15.1 |
| Stress whitening | [ΔE] | 1.17 | 1.55 | 1.33 | 1.31 | 1.37 | 2.00 |

*rest to 100 wt.-% are antioxidants different to DSTDP, like Irganox 1010
Talc is magnesium silicate hydroxide CAS no. 14807-96-6
HDPE is the commercial product MB7541 of Borealis AG having a density of 954 kg/m$^3$ and a melt flow rate MFR$_2$ (190° C.) of 4 g/10 min.
DSTDP is (Di-Stearyl-Thio-Di-Propionate) (CAS no. 693-36-7).
MD is the metal deactivator "N,N'-bis (3(3',5'-di-tert. butyl-4'-hydroxyphenyl)propionyl)hydrazine" (CAS 32687-78-8).

The invention claimed is:

1. An injection molded article (IMA) comprising at least 90 wt.-%, based on the total weight of the injection molded article (IMA), of a polypropylene composition (PC), wherein said polypropylene composition (PC) comprises
   (a) at least 88.25 wt.-%, based on the total weight of the polypropylene composition (PC), of a heterophasic propylene copolymer (RAHECO);
   (b) 0.005 to 0.350 wt.-%, based on the total weight of the polypropylene composition (PC), of an organic metal deactivator (MD);
   (c) 0.005 to 0.400 wt.-%, based on the total weight of the polypropylene composition (PC), of a sulphur containing antioxidant (SAO);
   (d) 0 to 3.0 wt.-%, based on the total weight of the polypropylene composition (PC), of an inorganic filler (F); and
   (e) 0 to 8.0 wt.-%, based on the total weight of the polypropylene composition (PC), of a high density polyethylene (HDPE);

wherein further
the heterophasic propylene copolymer (RAHECO)
   (i) has a comonomer content in the range of 5.0 to 15.0 mol.-%,
   (ii) has a xylene cold soluble (XCS) fraction in the range of 9.0 to 18 wt.-%,
   (iii) comprises a propylene copolymer (M) having a comonomer content in the range of 0.4 to 2.0 mol.-%, and
   (iv) comprises an elastomeric propylene copolymer (R).

2. The injection molded article (IMA) according to claim 1, wherein the injection molded article (IMA) and/or the polypropylene composition (PC)
   (a) do(es) not contain a high density polyethylene (HDPE); or
   (b) comprise(s) a high density polyethylene (HDPE), wherein the polypropylene composition (PC) comprises more than 0 to 8 wt.-%, based on the total weight of the polypropylene composition (PC), of the high density polyethylene (HDPE).

3. The injection molded article (IMA) according to claim 1, wherein the injection molded article (IMA) and/or the polypropylene composition (PC)
   (a) do(es) not contain an inorganic filler (F); or
   (b) contain(s) an inorganic filler (F), wherein the polypropylene composition (PC) comprises more than 0 to 2 wt.-%, based on the total weight of the polypropylene composition (PC), of the inorganic filler (F).

4. The injection molded article (IMA) according to claim 1, wherein the comonomer of the propylene copolymer (M) is selected from ethylene, C4 to C12 α-olefin, and mixtures thereof.

5. The injection molded article (IMA) according to claim 1, wherein
   (a) the elastomeric propylene copolymer (R) has a comonomer content in the range of 45 to 65 mol.-%; and/or
   (b) the comonomer of the elastomeric propylene copolymer (R) is selected from ethylene, C$_4$ to C$_{12}$ α-olefin, and mixtures thereof.

6. The injection molded article (IMA) according to claim 1, wherein the heterophasic propylene copolymer (RAHECO) has (a) an amorphous fraction in the range of 8.0 to 15 wt.-%; and/or (b) melt flow rate MFR$_2$ (230° C.) in the range of 3.0 to 12 g/10min.

7. The injection molded article (IMA) according to claim 1, wherein the amorphous fraction (AM) of the heterophasic propylene copolymer (RAHECO) has (a) a comonomer content in the range of 35 to 55 mol.-%; and/or (b) an intrinsic viscosity (IV) in the range of 2.0 to 2.8 dl/g.

8. The injection molded article (IMA) according to claim 1, wherein the high density polyethylene (HDPE) has density in the range of 0.940 to 0.970 g/cm$^3$.

9. The injection molded article (IMA) according to claim 1, wherein the inorganic filler (F) is talc.

10. The injection molded article (IMA) according to claim 1, wherein the organic metal deactivator (MD) is a phenol derivative.

11. The injection molded article (IMA) according to claim 1, wherein the sulphur containing antioxidant (SAO) is di-stearyl-thio-di-propionate (H$_{37}$C$_{18}$OC(O)CH$_2$CH$_2$SCH$_2$CH$_2$C(O)OC$_{18}$H$_{37}$).

12. The injection molded article (IMA) according to claim 1, wherein said injection molded article (IMA) and/or the polypropylene composition (PC) has/have a melt flow rate MFR2 (230° C.) in the range of 4.0 to 10 g/10min.

13. The injection molded article (IMA) according to claim 1, wherein said injection molded article (IMA) is a battery case.

* * * * *